United States Patent [19]
Kaneda

[11] Patent Number: 4,566,773
[45] Date of Patent: Jan. 28, 1986

[54] FOCUS DETECTING DEVICE
[75] Inventor: Naoya Kaneda, Kanagawa, Japan
[73] Assignee: Canon Kabushiki Kaisha, Tokyo, Japan
[21] Appl. No.: 622,686
[22] Filed: Jun. 20, 1984
[30] Foreign Application Priority Data
  Jun. 24, 1983 [JP] Japan .............. 58-96702[U]
[51] Int. Cl.[4] .................................. G03B 3/00
[52] U.S. Cl. ........................................ 354/403
[58] Field of Search ................... 354/403, 165
[56] References Cited
U.S. PATENT DOCUMENTS
  3,856,399 12/1974 Hosoe et al. ............... 354/403
  4,150,888 4/1979 Filipovich .................. 354/403
  4,357,085 11/1982 Niwa et al. ................. 354/403

FOREIGN PATENT DOCUMENTS
  54305 3/1983 Japan .......................... 354/403
  54324 3/1983 Japan .......................... 354/403

Primary Examiner—William B. Perkey
Attorney, Agent, or Firm—Toren, McGeady, Stanger, Goldberg & Kiel

[57] ABSTRACT

A focus detecting device with two optical systems for measuring an object distance, having their optical axes separated at a base line length. One of the axes lies within a photographic objective lens system and the other lies outside of it. The optical axis of the former is offset from the optical axis of the photographic lens system in a direction away from the optical axis of the latter.

4 Claims, 9 Drawing Figures

FOCUS DETECTING DEVICE

BACKGROUND OF THE INVENTION

1. Field of the Invention

This invention relates to improvements in the device for detecting focusing conditions of a principal image forming optical system on a trigonometrical basis.

2. Description of the Prior Art

The auto-focus apparatus of the type in which the focus detecting device projects onto an object to be photographed a non-harmonic light to the ambient light and receives the reflection of the non-harmonic light from the object, producing an output signal representing the distance from the device to the object, and a photographic lens is moved in response to a signal to focus an image of the object, or of the so-called active type, have been proposed in many forms. An early form of the active type auto-focus apparatus is shown in U.S. Pat. No. 3,442,193.

In this apparatus, the light projecting means and the reflection receiving means are positioned on the basis of the principle of trigonometrical survey, and operate without depending on the photographic lens optical system. To measure the object distance, therefore, special two optical systems must be respectively used for light projecting and receiving means. The use of such a not-through-the-lens or external range finder type focus detecting device leads to an increase in the size of the auto-focus apparatus.

Another type of focus detecting device is a non-harmonic light projection optical system which is provided outside of the photographic lens optical system, but the non-harmonic light reflection is sensed through the photographic lens optical system, as shown in U.S. Pat. No. 3,678,835, in the embodiment of FIG. 5. This type has an alternative problem of lowering distance measurement accuracy, because the base line length is necessarily short. On the other hand, the external range finder type shown in U.S. Pat. No. 3,442,193 is amenable to increasing the base line length to a desired value for the purpose of obtaining highly accurate distance measurement.

An object of the present invention is to provide a focus detecting device which has overcome the above-described problems and which improves focus detection accuracy without involving an increase in the size thereof.

To achieve this, according to the present invention, the optical axis of one of the two optical systems for measuring the object distance, which lies in the interior of a principal image forming optical system, is offset from the optical axis of the principal image forming optical system in a direction farther away from the optical axis of the other distance measuring optical system, so that the base line length is longer than the distance between the optical axes of the principal image forming optical system and the latter object distance measuring optical system.

SUMMARY OF THE INVENTION

A lens mounting comprising a photographic optical system, a lens holder and light emitting means including an element for emitting a distance measuring light along the direction of an optical axis of the photographic optical system. The apparatus also includes a reflection optical system at a position offset from the optical axis to deflect toward an object to be photographed and light receiving means arranged outside the effective diameter of the photographic optical system to receive the reflection of the distance measuring light.

DESCRIPTION OF THE PREFERRED EMBODIMENTS

The present invention will be described in great detail in embodiments thereof in conjunction with the drawings.

Figure 1:
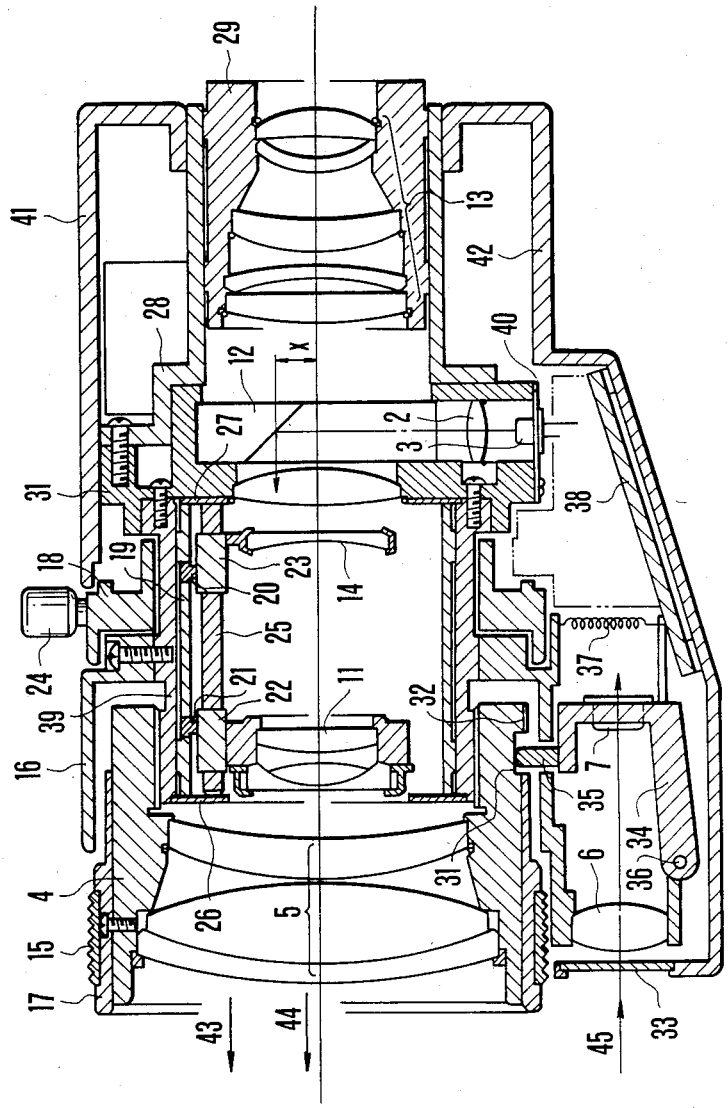
FIG. 1 is a sectional view of an embodiment of the focus detecting device, according to the present invention, applied to a zoom lens mounting.
Figure 2:
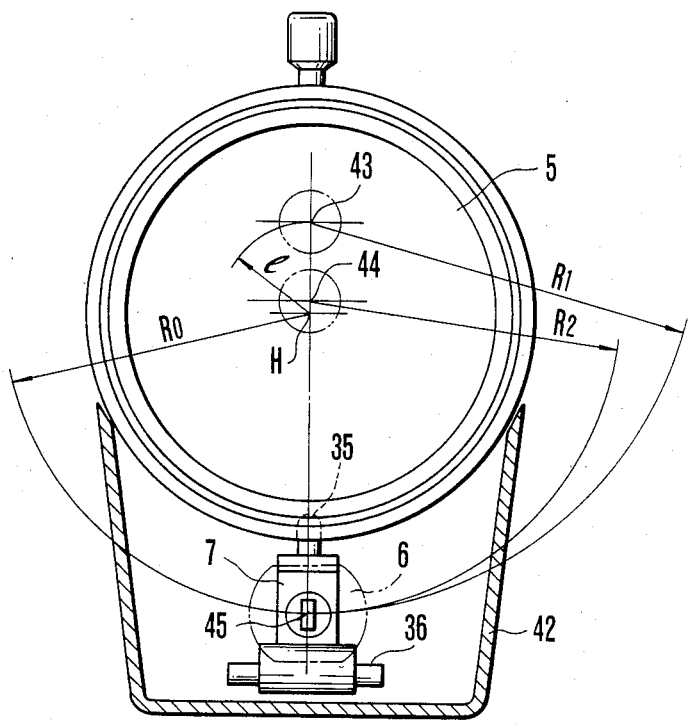
FIG. 2 is a front plan view of the device of FIG. 1.

FIGS. 1 and 2 illustrate a first embodiment of the invention where reference numeral 1 identifies an object to be photographed; a projection lens 2 forms a spot image with a non-harmonic light from a light emitting means 3. A barrel 4 contains a group of focusing members 5. A collection lens 6 in the form of, for example, an aspherical mold lens, forms a spot illumination image of the non-harmonic light on the object 1 on a light receiving element 7. The light receiving element 7 uses a silicon photo-cell, or a solid state image pickup element. The image receiving surface or light receiving element 7 is divided into two parts 7a and 7b from which outputs proportional to the amounts of light received are applied to a control circuit 8. The control circuit 8 controls the direction of rotation of an electric motor M and its movement is in accordance with the difference between the outputs of the areas 7a and 7b of the light receiving element 7. In practice, the control circuit 8 includes amplifiers, integrators, a difference amplifier, a drive direction detector, and a rotation speed control circuit for the motor M. But, only the control circuit 8 is shown here. The motor M moves the barrel 4 axially (in the direction indicated by an arrow) through a gear train (not shown) and at the same time moves the light projection element 3 and the light receiving element 7 as the object distance varies. A cam provided on the outer periphery of the barrel 4 moves the light projection element 3 and the light receiving element 7. The light projection element 3 and the light receiving element 7 may be otherwise fixed, and instead the projection lens 2 and the collection lens 6 must be moved as the focusing lens holder 4 moves. A ray of light 9 is projected from the light projection element 3. A ray of light 10 is incident on the light receiving element 7.

The technique of the light receiving element 7 and a control system for performing focus detection on the basis of the light receiving element 7 (7a, 7b) is that the light receiving portion of the light receiving element 7 is divided into the two regions 7a and 7b and the movement of the focusing lens 5 is controlled in accordance with the signals from the two light receiving regions 7a and 7b performing focusing.

Reference numeral 11 identifies a variator lens. Reference numeral 12 identifies a prism by which the projected light ray 9 from the light projecting element 3 is deflected 90°, becoming a parallel optical axis to the photographic optical axis.

The projected light ray 9 is deflected by a reflection mirror 12a in the prism 12. It is noted that the center of the reflection mirror 12a lies at a distance "x" from the photographic optical axis.

A compensator lens 14 compensates for the shift of the image plane when the magnification power is varied by the variator lens 11. Reference numeral 15 identifies an actuator rubber ring. An index ring 16 has at its front end portion an index for cooperation with a distance scale on a ring 17, and at its rear end portion another index for cooperation with a focal length scale on a zoom actuator ring 18. The zoom actuator ring 18 is connected to a cam sleeve 19. In the cam sleeve 19 are cut camming slots (not shown) in which are engaged pins 20 and 21. The pins 20 and 21 are fixedly mounted on moving members 22 and 23. When an actuator knob 24 is turned, the cam sleeve 19 starts to rotate, and the pins 20 and 21 move along the camming slots (not shown) so that the moving members 22 and 23 move axially, guided by a bar 25. Reference numerals 26 and 27 identify lens base plates. A relay holder sleeve 28 supports a relay holder 29.

A prism holder 31 holds the prism 12 and the light projection lens 2. In the outer periphery of the barrel 4 are provided a radial cam portion 31 and a geared portion 32. The radial cam portion 31 is formed in such a way that the depth of the groove varies depending on the circumferential position of the barrel 4. A visible light cut filter 33 is positioned in front of the light collection lens 6. The light receiving element 7 is contained in a light receiving element holder 34. This light receiving element holder 34 has a cam follower 35 at the free end thereof and is pivotally mounted at a pin 36. The pivot pin 36 is fixedly mounted on the index ring 16. A spring 37 always urges the cam follower 35 toward the radial cam portion 31. The signal from the light receiving element 7 is computed by a computer circuit provided on a substrate 38, its computed result is sent to a motor (not shown), the motor starts to drive, and the motion is transmitted by a belt-gear train or the like (not shown) to the geared portion 32, whereby the barrel 4 starts to rotate. The barrel 4 is threadedly connected to a fixed barrel 39 so that, as it rotates, it moves axially performing focus adjustment. Reference numeral 40 identifies a base plate on which the light projecting element 3 is fixedly mounted. Reference numerals 41 and 42 identify covers. Reference numeral 43 identifies an optical axis of light projection when the focal length of the lens group 5 is longest. Reference numeral 44 identifies an optical axis of light projection when it is shortest, and 45 identifies an optical axis of light reception. The optical axis of light reception 45, a photographic optical axis H and the optical axes of light projection 43 and 44 lie on one and the same plane (see FIG. 2), the optical axis of light projection 43 is farther away from the optical axis of light reception 45 than the base line length R0 by a distance l, having a base line length R1 another optical axis of light projection 44 has a base line length R2. There is the relationship: base line length R1> base line length R2> base line length R0.

Next the operation will be described. The light ray projected from the light projecting element 3 passes through the projection lens 2, is deflected 90° by the prism 12, and focuses a projected light spot image on the object through the variator system lens 11 and the lens group 5. The reflected light or light ray of light reception 10 becomes a light ray free from the ambient light component in passing through the visible light cut filter 33, and focuses an image on the light receiving element 7 through the collection lens 6. Thereby, the signals from the regions 7a and 7b of the light receiving element 7 are sent to the computer circuit provided on the substrate 38. The computer circuit computes the signals and moves a motor (not shown) by its computed result. Motion of the motor is transmitted through the belt-gear train (not shown) to the geared portion 32, whereby the barrel 4 starts to rotate. With the barrel 4 rotating, the lens group 5 moves axially to effect focusing. Such rotation of the barrel 4 also causes variation of the depth of the groove of the cam portion 31 at a circumferential position. Since, at this time, the cam follower 35 provided on the free end of the light receiving element holder 34 always abuts on the cam portion 31, as the barrel 4 rotates, the light receiving element 7 moves either upward or downward, while maintaining a certain relationship. The output of the light receiving element 7 changes by the upward or downward movement of the light receiving element 7. When the output becomes zero, the motor stops, and the lens group 5 stops in an in-focus position.

The base line length R0 shown in FIG. 2 represents the base line length when the reflection mirror 12a is arranged so that the light projection 9 ray coincides with the photographic optical axis H. Therefore, the base line length R0 represents the distance between the light receiving element 7 and the photographic optical axis. In a contrary manner, the base line length of this embodiment is R1 in the longest focal length position, or R2 in the shortest focal length position, and these are related such that the base line length R1> the base line length R2> the base line length R0. That is, a feature of the invention is that the optical axes of the projection 43 and 44, which pass through the interior of the photographic lens (lens group 5), are offset so they do not coincide with the photographic optical axis H. This gives the advantage that without changing the size of the external form at all, the base line length can be greater than the base line length R0. Where focus detection is carried out on the basis of the trigonometrical survey, the greater the base line length, the greater the accuracy of focus detection. The base line length R2 in the shortest focal length position is shorter than the base line length R1 in the longest focal length position. But, because the field depth is deeper when in the shortest focal length position than when in the longest focal length position, there is a relationship: the base line length R2< the base line length R1, no distance measurement accuracy problems arise. In other words, as is well known, the deeper the field depth, the wider the in-focus range.

Figure 3:
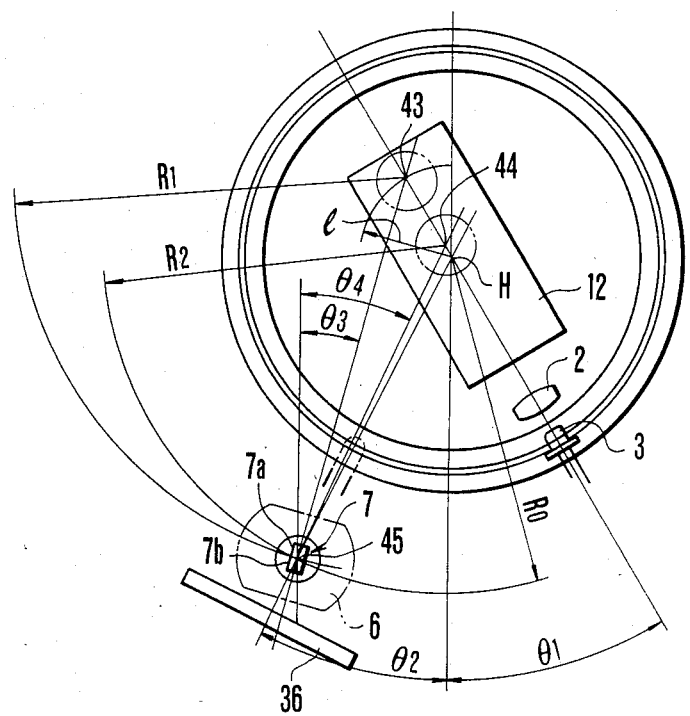
FIG. 3 is a view similar to FIG. 2 except that another embodiment of the invention is illustrated.

In the embodiment described in conjunction with FIGS. 1 and 2, the optical axes of the light projection 43 and 44 and the photographic optical axis H lie in the same plane. But a situation where the optical axes of light projection 43 and 44 and the photographic optical axis H do not lie in the same plane may be encountered. That is, the light projecting element 3 and the light receiving element 7 must be positioned to allow smooth manual zooming and manual focusing. Another requirement for preventing noise production due to the leakage of light projected from the light projection element 3 toward the light receiving element 7 is fulfilled by increasing the distance between the light projecting element 3 and the light receiving element 7. Another embodiment taking these situations into account is shown in FIG. 3, where the same reference characters denote parts similar to those shown in FIG. 2. The light projecting element 3, the light projection lens 2 and the prism 12 are laid in an inclined position by an angle $\theta 1$ (the value of angle $\theta$ is determined by taking into account the manageability). The light receiving element 7 has its axis of rotation perpendicular to a plane containing the optical axis of light reception and the photographic optical axis H, and is laid in an inclined position by an angle $\theta 2$ in a direction opposite to the light projecting element 3. The angle $\theta 2$ may also take a desired value. The base line length in the longest focal length position and the base line length in the shortest focal length position have similar values respectively to R1 and R2 of FIG. 2 for the purpose of equivalent distance measurement accuracy.

Figures 4A, 4B:
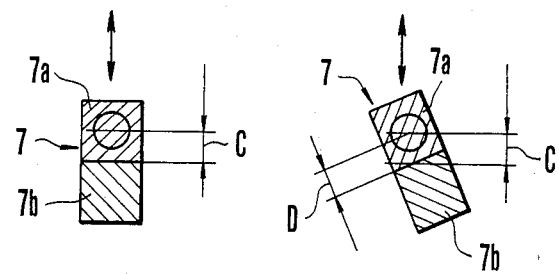
FIGS. 4(a) and 4(b) illustrate how to orient the light receiving element of FIG. 3.

It is better that the two-part 7a and 7b light receiving element 7 is so oriented that a direction perpendicular to the boundary line between the regions 7a and 7b thereof lies between the optical axis of the light projection 43 in the longest focal length position and the optical axis of light projection 44 in the shortest focal length position, namely, in FIG. 3, an angle between the values $\theta 3$ and $\theta 4$. What value within this angle range, or which of the angles $\theta 3$ and $\theta 4$, or an intermediate angle therebetween, is employed depends on the designer. But, when the diameter of the spot image of the received light in the shortest focal length position does not exceed the width of the surface of the light receiving element 7, it generally employs the orientation angle $\theta$ (toward the optical axis of light projection 43) as shown in FIG. 3. This is because, the spot image of the received light that changes its place on the surface of the light receiving element 7 is detected, when the direction perpendicular to the boundary line of the regions 7a and 7b is coincident with that having the angle $\theta$, the displacement direction of the spot image of the received light becomes perpendicular to the boundary line as illustrated in FIG. 4(a) (the direction indicated by an arrow). If the direction perpendicular to the boundary line is otherwise oriented toward the photographic optical axis H, the spot image of the received light changes its position to a direction inclined perpendicular to the boundary line as illustrated in FIG. 4(b). Therefore, the displacement amount of the spot image of the received light takes a maximum value C in FIG. 4(a). But in FIG. 4(b), the substantial value of the amount of displacement D becomes smaller than the value C. The difference between the values C and D decreases the efficiency. For this reason, in order to obtain the displacement shown in FIG. 4(a) in the longest focal length position, it is necessary to put the light receiving element 7 in the direction of angle $\theta 3$. It may be oriented to the optical axis of the light projection 44. But, as has been mentioned above, since the field depth is shallower in the longest focal length position, it is advantageous to employ the angle of orientation to the optical axis of the light projection 43.

Figure 5:
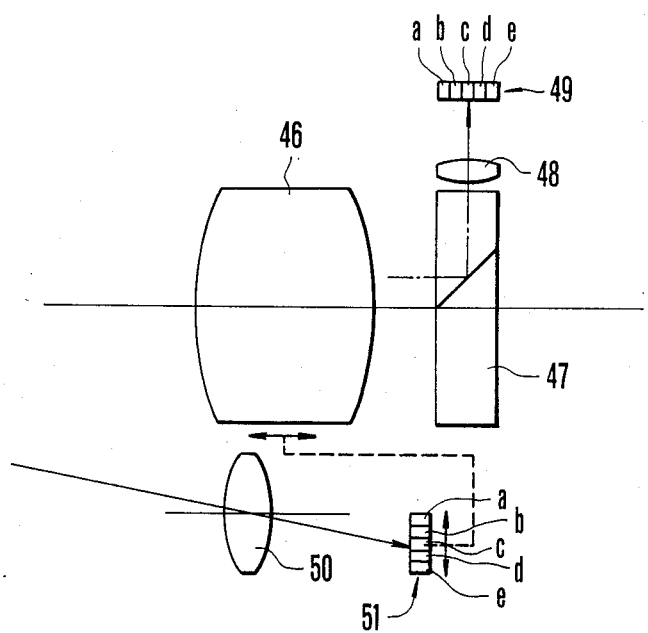
FIG. 5 is a schematic sectional view of another embodiment of the invention.

FIG. 5 illustrates another embodiment of the present invention. In FIG. 5, not the zoom lens, but a focal length lens is used. A lens component 46 is related to focus adjustment. Behind it is laid a prism 47. Reference numeral 48 identifies a collection lens. By the combined focal length of the lens component 46 and the collection lens 48, an image of the object is focused on the light receiving element 49. Another collection lens 50 has the same focal length as the combined focal length of the lens component 46 and the collection lens 48. Another light receiving element 51 is constructed with five regions "a" to "e", similar to the first light receiving element 49. The intensities of light incident on the regions "a" to "e" are individually sensed. Although the number of regions "a" to "e" has been described as five, the larger the number, the greater the focus detection accuracy.

The focus control operates in such a way that the output from the first light receiving element 49 is compared with the output from the second light receiving element 51, and the light receiving element 51 and the lens component 46 are moved to equalize the output of the light receiving element 51 with the output of the first light receiving element 49. For example, letting Xa denote the output from the first region "a" of the first light receiving element Xb the output from the second region "b" ..., Ya the output from the first region "a" of the second light receiving element 51, Yb the output from the second region "b" ..., an in-focus condition is established when $|Xa-Ya|+|Xb-Yb|+|Xc-Yc|+|Xd-Yd|+|Xe-Ye| \leq K$ (where K is constant). For this purpose, the second light receiving element 51 is operatively connected to the lens component 46 by a cam mechanism (not shown).

Although not shown in the drawings, each of the light receiving elements 49 and 51 of FIG. 5 may be replaced by a light projecting element. When two spots of illumination on the object coincide with each other, the in-focus condition is established.

In the embodiment of FIG. 1, the lens component 5, the variator lens 11, the prism 12, the compensator lens 14 and a relay lens 13 constitute a principal image forming optical system. The lens component 5, the variator lens 11, the compensator lens 14, the prism 12 and the projection lens 2 correspond to one of the two optical systems for measuring the object distance, and the collection lens 6 corresponds to the other object distance measuring optical system. In the embodiment of FIG. 5, the lens component 46 and the prism 47 correspond to the principal image forming optical system. The lens component 46, the prism 47 and the collection lens 48 correspond to one object distance measuring optical system, and the second collection lens 50 corresponds to the other object distance measuring optical system.

Figure 6:
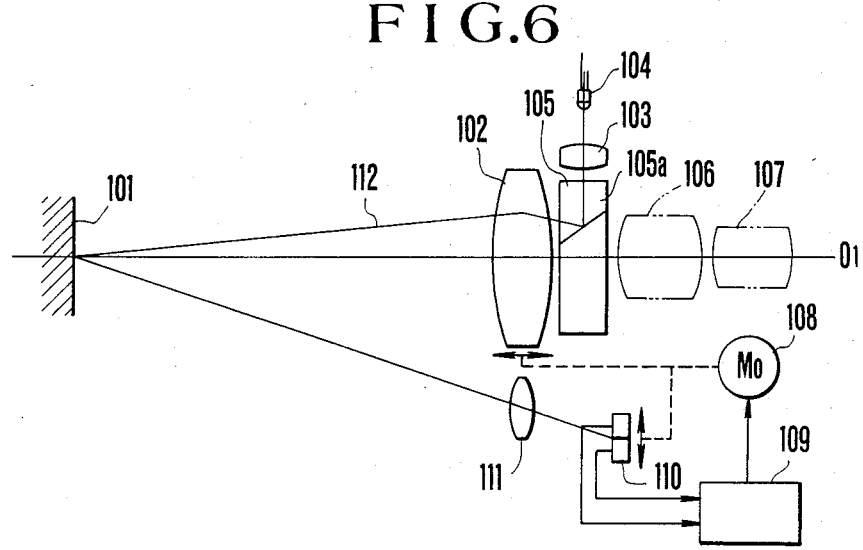
FIGS. 6 to 8 are schematic sectional views of other applications of the invention.

FIG. 6 illustrates an example of a modification of the embodiment of FIG. 1. In the embodiment of FIG. 1, the distance measuring light 9 is projected through the zoom components 11 and 14 onto the object. Therefore, as zooming is carried out, the diameter of the spot of projected light varies. Because of this, distance measurement accuracy in the wide angle positions is lower than in the telephoto positions. In FIG. 6, therefore, the light projecting means comprised of a light projecting element 104, a projection lens 103 and a prism 105 are positioned between a focusing lens 102 and a zoom lens 106, so that the spot diameter of projected light does not change with zooming, and the position of the center of a reflecting portion 105a is offset from the photographic optical axis 01. Reference numeral 110 identifies a light receiving element. Reference numeral 111 identifies a collection lens and 109 identifies a control circuit. Reference numeral 108 identifies a focusing lens control motor and 107 identifies a relay lens.

Figure 7:
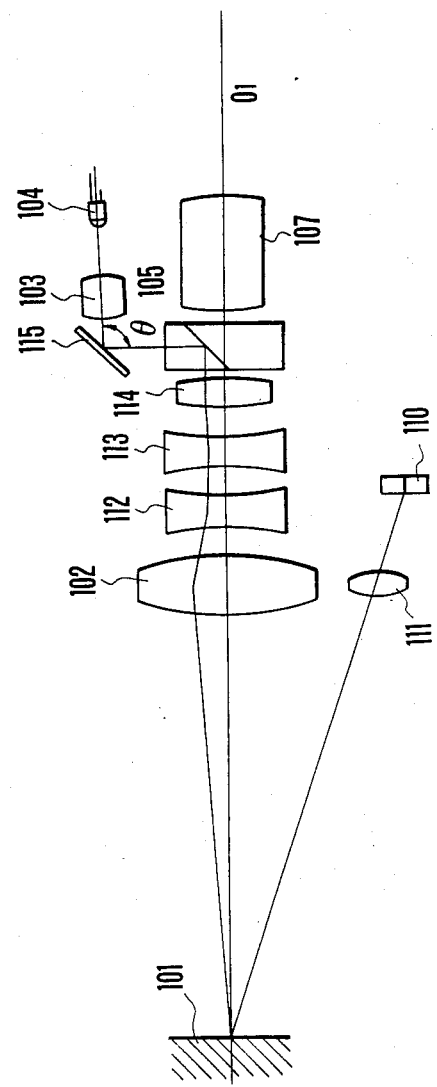

FIG. 7 illustrates another modification of the embodiment of FIG. 1.

With the photographic lens system comprising the focusing lens 102, zoom lenses 112 and 13, and a relay lens of which a front part 114 is afocal, when the projected light comes from a space between afocal, when the projected light comes from a space between the front and rear parts 114 and 107 of the relay lens as illustrated in FIG. 7, a light emitting element 104 is in an optically equivalent position to the image forming position of the photographic lens. In this case, it is desirable that the light ray projection behind the afocal lens component 114 be parallel to the photographic optical axis H. Actually, however, the parallelism is very often slight broken. For this reason, the spot image of the projected light has aberrations which are a bad influence on distance measurement accuracy. To correct the aberrations, in the embodiment of FIG. 7, the light emitting element 104 is otherwise oriented so that the ray of projected light becomes just parallel to the photographic optical axis H, the ray of projected light 104a after having passed through the projection lens 103 is deflected about 90° by a first reflection mirror 115 to the photographic optical axis 01, and further deflected by the reflecting portion 105a of the prism 105 to the object.

And, to correct the aforesaid aberrations, the angle of reflection of the first mirror 115 is adjusted to an angle greater than 90°.

Figure 8:
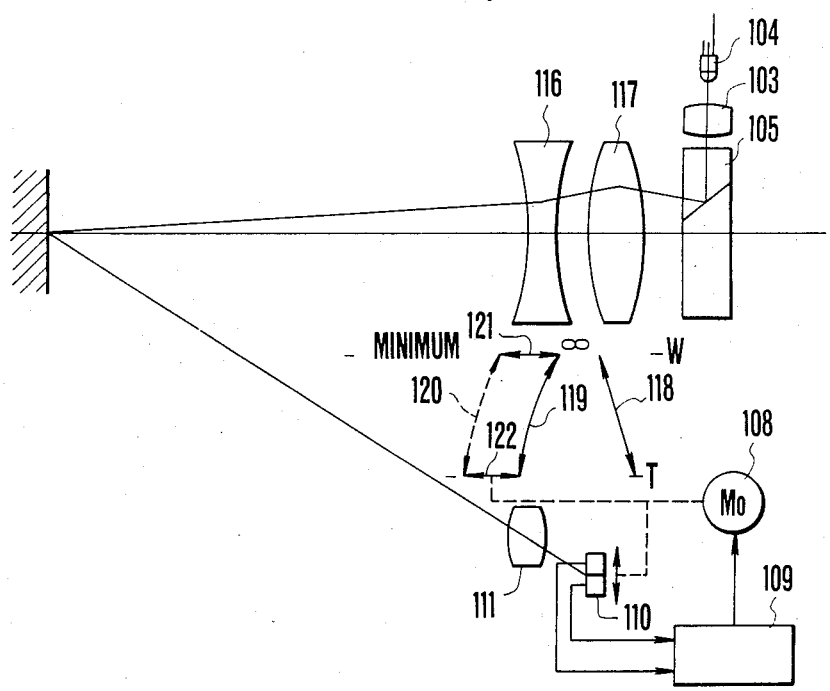

FIG. 8 illustrates still another example applied to the zoom lens 112 or 113 having a first lens component 116 movable for focusing and varying the magnification power, and a second lens component 117 as the compensator. The same reference numerals as in the foregoing embodiments have been employed.

As has been described above, according to the present invention, the optical axis of the one object distance measuring optical system, which is arranged in a principal image forming optical system, is offset from the optical axis of the principal image forming optical system in a direction farther away from the optical axis of the other distance measuring optical system. Thereby, the base line length is longer than the distance between the optical axes of the principal image forming optical system and the other distance measuring optical system, advantageously improving the accuracy of focus detection without increasing the size.

What I claim:
1. A lens mounting comprising:
  (a) a taking lens including a focusing lens and a lens holder for said taking lens;
  (b) light emitting means having a light emitting element housed within said lens holder and a reflection mirror for reflecting the light beam projected from said light emitting element toward an object to be photographed, wherein said reflection mirror is placed at a position opposing said light emitting element, sandwiching the optical axis of said focusing lens therebetween, and the optical axis of projected light beam, after being reflected, is offset from the optical axis of the focusing lens; and
  (c) means for receiving a reflected light beam which has also been reflected by the object, said light receiving means being placed at a position at the outside of an effective diameter of said taking lens and at a side of the optical axis of said taking lens at which said light emitting element is placed.

2. A lens mounting comprising:
  (a) a focusing lens, a variator lens and a lens holder for housing each one of said lenses;
  (b) light emitting means comprising a light emitting element, a projection lens and a reflection mirror, each member of said light emitting means being placed within said lens holder and on a camera side of said focusing lens and said variator lens, and said light emitting element and said reflection mirror opposing each other with the optical axis of said lenses therebetween, whereby a light beam reflected by said reflection mirror advances toward an object in a path being offset from said optical path of the lenses; and
  (c) means for receiving a reflected light beam which has also been reflected from the object, said light receiving means being positioned outside said lens holder and being provided on the same side of said optical axis of the lenses on which the light emitting element is positioned.

3. A lens mounting according to claim 1 or 2, wherein said light emitting means and said light receiving means are positioned in such a manner that a segment of line connecting the center of the light emitting element constituting said light emitting means and the center of said reflection mirror and a segment of line connecting the center of said light receiving means and the center of said reflection mirror are offset from each other.

4. A lens mounting according to claim 3, in which said light receiving means includes a half divided light receiving element and when an angle formed by a segment of line perpendicular to the dividing line of said light receiving element and a line perpendicular to the optical axis of the lenses is expressed by an angle $\theta 3$ at a long focal length of a zoom lens consisting of said focusing lens and variator lens and by an angle $\theta 4$ at a short focal length of the same, said light receiving elements are placed between said angle $\theta 3$ and said angle $\theta 4$.

* * * * *